May 24, 1938.　　　R. P. JUTSON　　　2,118,246
REGULATING SYSTEM
Filed May 20, 1936
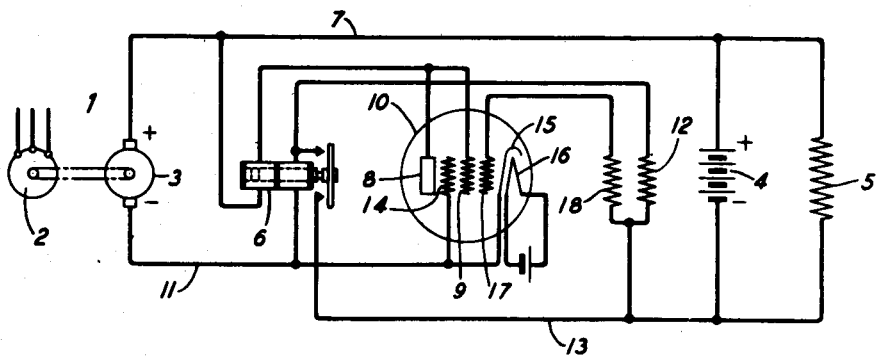
INVENTOR
R. P. JUTSON
BY P. C. Smith
ATTORNEY Patented May 24, 1938

2,118,246

UNITED STATES PATENT OFFICE 2,118,246

REGULATING SYSTEM

Robert P. Jutson, North Tarrytown, N. Y., assignor to Bell Telephone Laboratories, Incorporated, New York, N. Y., a corporation of New York Application May 20, 1936, Serial No. 80,801

5 Claims. (Cl. 171—314)

This invention relates to a power supply system in which a generator is used in connection with a storage battery and more particularly to a system for controlling the connection of a generator to a battery associated with a load circuit.

The object of the invention is to secure the automatic connection and disconnection of a generator to a load circuit in a simple, reliable manner.

In systems in which power is normally supplied from a storage battery and in which it is necessary to float the generator of a motor-generator set on the storage battery and load to maintain the battery in a properly charged condition, provision must be made for insuring that when the motor-generator set is started up it will not be connected across the battery and load until after the generator is delivering a voltage greater than that of the battery and that the generator will be automatically disconnected if the voltage which it delivers should fall below that of the battery. This provision is essential since if the generator were connected to the battery when its delivered voltage is less than the battery voltage, the battery would tend to operate the generator as a motor.

In accordance with the present invention this object is attained by a circuit breaker relay which is controlled by a vacuum tube. The relay has two windings, one of which is an operating shunt winding energized over the cathode-anode circuit of the tube and the other of which is a holding winding connected in series between the generator and battery. With the generator not operating, or if operating, delivering a lower voltage than the battery voltage, current will flow from the battery toward the generator through a resistance and the holding winding of the relay, but will not operate the relay. The drop in voltage across the resistance biases the grid of the tube negatively thereby blocking the tube. As soon, however, as the generator produces a voltage higher than the battery voltage, current will flow in the reverse direction from the generator toward the battery through the holding winding of the relay and through the resistance tending to operate the relay and causing the potential on the grid of the tube to become positive. With the grid of the tube positive the tube now passes sufficient current therethrough and through the operating shunt winding of the relay to operate the relay which then connects the generator directly across the battery and load and short-circuits the resistance. With the resistance short-circuited the potential on the grid of the tube again becomes negative and the operating shunt winding of the relay does not now receive sufficient current to maintain the relay operated. The relay, however, is now maintained operated over its holding winding, assisted by the weak current flowing through the operating shunt winding.

Should the generator now stop, or its voltage fall below that of the battery so that current flows from the battery toward the generator, the current flowing through the holding winding of the relay reverses in direction and the relay releases and disconnects the generator from the battery.

The invention and the mode of its operation will be more clearly understood from the following description taken in connection with the accompanying drawing.

Referring to the drawing, a motor-generator set is schematically disclosed at 1, the motor 2 of this set being operable from alternating current supplied over the power mains indicated. A storage battery is disclosed at 4 which is connected to a load circuit illustrated for convenience by the resistance 5. A two-winding circuit breaker relay 6 has its left or operating winding connected between the positive bus bar 7, which connects the positive terminal of the generator 3 to the positive terminal of the battery 4, and the plate or anode 8 and screen grid 9 of the pentode vacuum tube 10. The right or holding winding of relay 6 is connected in a circuit which extends from the negative bus bar 11, connected to the negative terminal of the generator 3, through the right or holding winding of relay 6 and resistance 12 to the negative bus bar 13 which is connected to the negative terminal of battery 4.

The contacts of relay 6 when closed by the energization of the operating winding of the relay are effective to establish a connection from the negative bus bar 11 through the right winding of the relay to the negative bus bar 13 thus effecting the connection of the negative terminal of generator 3 to the negative terminal of battery 4 and establishing a short circuit around resistance 12.

The suppressor grid 14 and cathode 15 of tube 10 are connected to the negative bus bar 11, the cathode being heated in any desired manner as by the filament battery shown, or from an alternating current supply. The control grid 17 of the tube is connected through resistance 18 to the negative bus bar 13, the resistance 18 serving to prevent the flow of excess current to the grid 17.

It will now be assumed that the motor-generator set 1 is not operating and that it becomes desirable to start it up to supply current from the generator 3 to the storage battery 4 and to the load 5. As the motor-generator set starts up the voltage delivered by the generator 3 will gradually increase. With the rise in generator voltage a small current will flow from the positive bus bar 7, through the left winding of relay 6, over the plate 8 and cathode 15 of tube 10 back to the generator over bus bar 11. During that period when the generator voltage is below that of the battery 4, current will flow from the positive terminal of battery 4 over bus bar 7 through the generator 3, the right winding of relay 6 through resistance 12 back to the negative terminal of the battery. With the current flowing in this manner the potential on the control grid 17 will be negative with respect to the cathode 15 due to the potential drop across resistance 12 and the space current which flows from plate 8 to cathode 15 of the tube will be small.

As soon, however, as the generator 3 delivers a voltage higher than the voltage of battery 4, current will flow from the positive terminal of generator 3 over bus bar 7 through battery 4, through resistance 12, right winding of relay 6, bus bar 11 to the negative terminal of generator 3. The current flowing through the right winding of relay 6 will energize this winding, but not sufficiently to cause the relay to close its contacts. Since the current flowing through resistance 12 has now been reversed in direction, the potential drop across resistance 12 will be of reverse sign and consequently the potenial on control grid 17 will now be positive with respect to the potential on cathode 15. With positive potential on grid 17 a large current will now flow through the vacuum tube 10 from the bus bar 7 through the left winding of relay 6, plate 8, cathode 15 to bus bar 11.

The left or operating winding of relay 6 is now energized and the relay closes its contacts. Upon closing its contacts the generator 3 is directly connected to battery 4, the positive terminal of the generator being connected to the positive terminal of the battery over bus bar 7 and the negative terminal of the generator being connected over bus bar 11 through the right winding and contacts of relay 6 and bus bar 13 to the negative terminal of the battery, the resistance 12 being now short-circuited over the contacts of relay 6. The right winding of relay 6 will now receive sufficient current to hold the relay operated independent of the continued energization of its left or operating winding. Upon the short-circuiting of resistance 12 the potential on the control grid 17 of tube 10 again becomes negative with respect to the cathode 15 and the space current flowing through the tube now becomes reduced. The generator now continues to supply power to the storage battery 4 and load circuit 5.

Should the motor-generator set 1 slow down or stop and the voltage generated by generator 3 fall below that of battery 4, the current flowing from the generator to the battery will be reversed in direction and thus current will flow in the reverse direction through the right or holding winding of relay 6. Since at this time a very small space current is flowing from the bus bar 7 through the left winding of relay 6 over the plate 8 and cathode 15 of tube 10, relay 6 will release and open its contacts thereby disconnecting the generator from the battery.

Although a pentode type vacuum tube has been disclosed, since this type of tube is better adapted to the transmission of a large space current, it is to be understood that a tube of the triode or tetrode type could be used successfully.

What is claimed is:

1. In combination, a battery, a load circuit connected across the terminals of said battery, a generator, a relay, a vacuum tube associated with said battery and said generator, said generator being normally connected in circuit with said relay across the output terminals of said tube, and means including said tube effective to cause the operation of said relay when the voltage delivered by said generator becomes greater than the voltage of said battery to connect said generator across said battery and said load circuit.

2. In combination, a battery, a load circuit connected across the terminals of said battery, a generator, a relay having an operating and a holding winding, and means including a vacuum tube associated with said battery and said generator and effective to cause the operation of said relay over its operating winding when the voltage delivered by said generator becomes greater than the voltage of said battery to connect said generator across said battery and said load circuit, said relay then being held operated by its holding winding.

3. In combination, a battery, a load circuit connected across the terminals of said battery, a generator, a relay having an operating and a holding winding, a vacuum tube associated with said battery and said generator, means including said vacuum tube effective to cause the operation of said relay over its operating winding when the voltage delivered by said generator becomes greater than the voltage of said battery, and a circuit closed by the operation of said relay extending through the holding winding thereof for connecting said generator across said battery and said load circuit and for holding said relay operated so long as said generator delivers a higher voltage than the voltage of said battery.

4. In combination, a battery, a load circuit connected across the terminals of said battery, a generator, a relay for connecting said generator across said load circuit, a vacuum tube, an operating circuit for said relay included in the cathode-anode circuit of said tube, and means for applying negative potential to the grid of said tube for blocking the flow of current over its cathode-anode circuit when the potential of said battery is greater than the potential of said generator and for applying positive potential to said grid whereby said tube operates said relay when the potential of said generator becomes greater than the potential of said battery.

5. In combination, a battery, a load circuit connected across the terminals of said battery, a generator, a relay having an operating and a holding winding for connecting said generator across said load circuit, a vacuum tube, a circuit for the operating winding of said relay included in the cathode-anode circuit of said tube, a resistance, a series circuit between said battery and generator extending through said resistance and said holding winding and a control grid for said tube connected to a point between said resistance and the negative terminal of said battery whereby when the potential of said generator is less than the potential of said battery the grid of said tube is biased negatively to block the flow of current over the cathode-anode circuit of said tube through the operating winding of said relay and whereby when the potential of said generator is greater than the potential of said battery the grid of said tube is biased positively and said tube causes said relay to operate and continue operated in response to its holding winding.

ROBERT P. JUTSON.